A. B. BACHMANN.
EDUCATIONAL MODELING DEVICE.
APPLICATION FILED JAN. 12, 1916.
1,226,049.
Patented May 15, 1917.
3 SHEETS—SHEET 1.
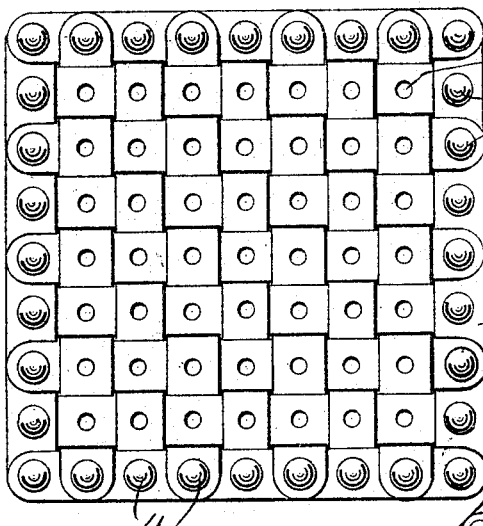
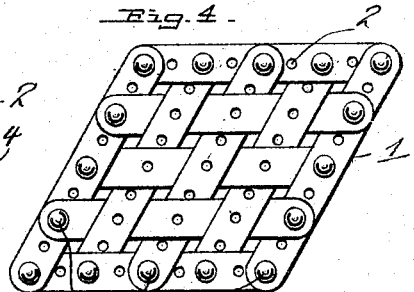
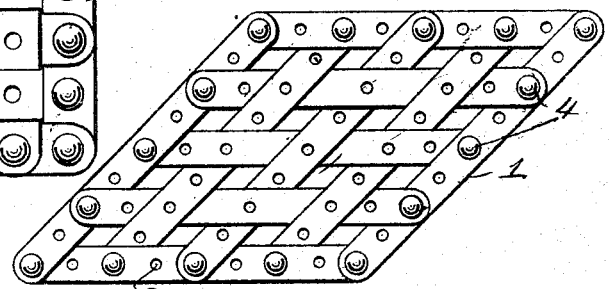
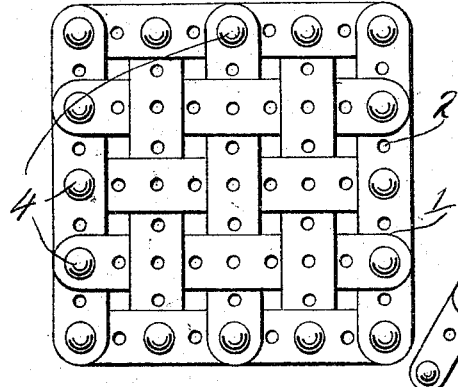
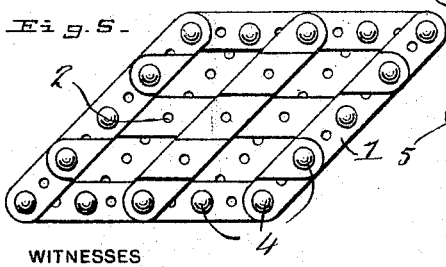
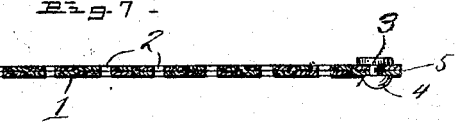
WITNESSES
INVENTOR
Alwin B. Bachmann.
BY
ATTORNEY

A. B. BACHMANN.
EDUCATIONAL MODELING DEVICE.
APPLICATION FILED JAN. 12, 1916.

1,226,049.

Patented May 15, 1917.
3 SHEETS—SHEET 2.

INVENTOR
Alwin B. Bachmann.

WITNESSES

BY

ATTORNEY

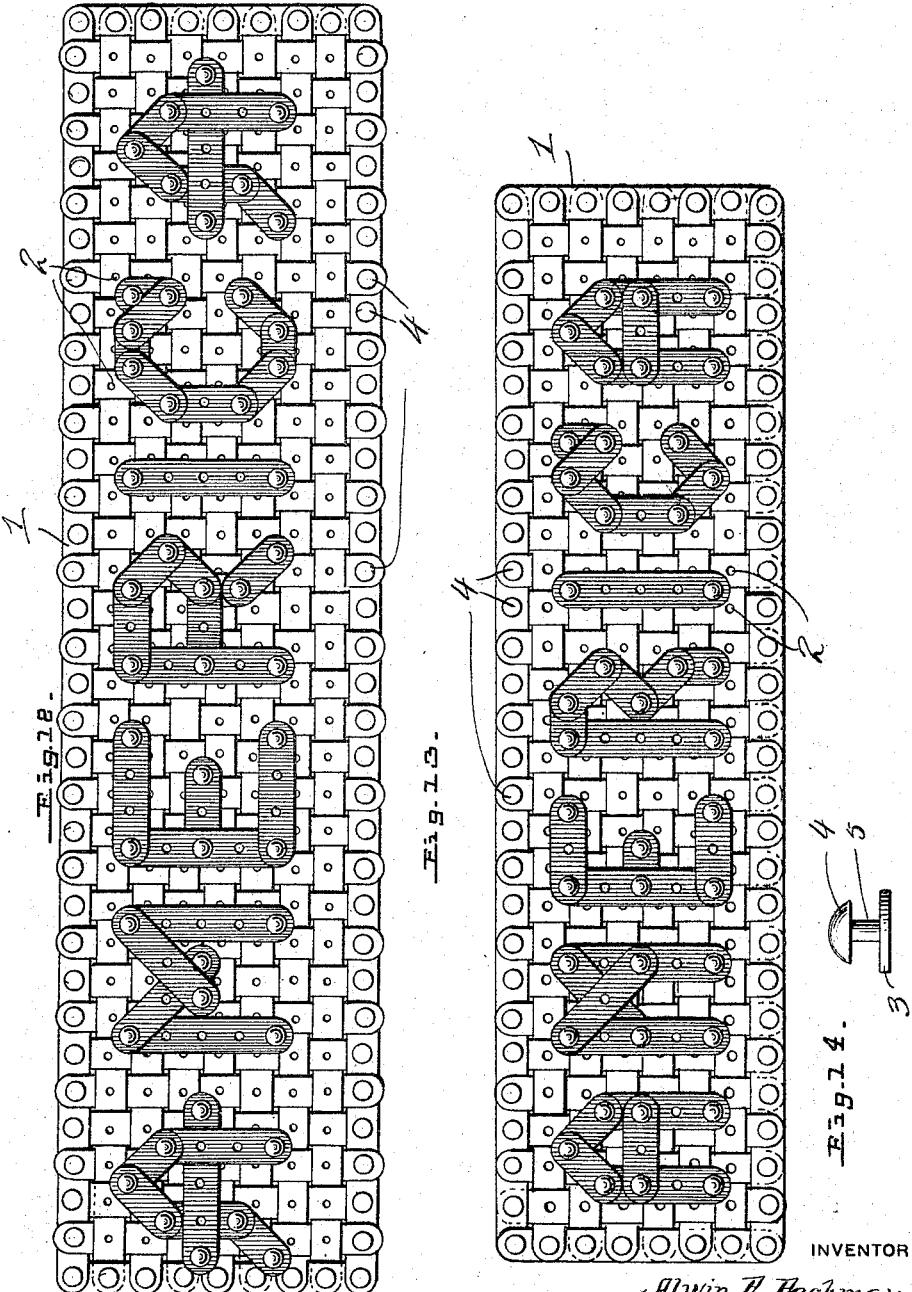

UNITED STATES PATENT OFFICE.

ALWIN B. BACHMANN, OF CINCINNATI, OHIO.

EDUCATIONAL MODELING DEVICE.

1,226,049. Specification of Letters Patent. Patented May 15, 1917.

Application filed January 12, 1916. Serial No. 71,737.

*To all whom it may concern:*

Be it known that I, ALWIN B. BACHMANN, a subject of the Emperor of Germany, residing at Cincinnati, in the county of Hamilton and State of Ohio, have invented certain new and useful Improvements in Educational Modeling Devices, of which the following is a specification.

This invention relates to an educational modeling device, such as may be used in training the minds of grown or infant beings along certain lines, and further, it forms a source of amusement as well as requiring skill in the manipulation of the same.

One object of the present invention is to provide a device of the above mentioned character which, by reason of its principle, is particularly adapted for many sorts of educational work such as teaching weaving, configurations, harmony of colors, letters, reading and the like.

Another object is to provide a device of this sort which is so constituted that the assembled forms thereof may have a utility.

A further object resides in providing a device which may be so manipulated as to present many puzzling problems of construction in the way of overlying and single patterns of plain or mixed colors.

With the above and other objects in view, I will now proceed to describe specific embodiments of the present invention which I have shown by way of illustration of the principles of the invention in the accompanying drawings wherein:

Figure 1 is a plan view of the device as assembled, in woven form, to produce a mat, pillow top or the like.

Fig. 2 is a plan view of the device as assembled in open weave to provide a diamond shape configuration.

Fig. 3 is a view similar to Fig. 2, but with a greater angularity between the marginal inclosing.

Fig. 4 is a view similar to Figs. 2 and 3.

Fig. 5 is a view similar to Figs. 2, 3 and 4, but showing the strips more closely assembled.

Fig. 6 is a view similar to Fig. 1, but showing the open weave.

Fig. 7 is a sectional view on the line 7—7 of Fig. 1.

Fig. 12 is a view showing the manner of assembling a word in connection with a back ground such as shown in Fig. 1.

Fig. 13 is a view similar to Fig. 12.

Fig. 14 is a view, in side elevation of one of the fastening members.

Figure 8:
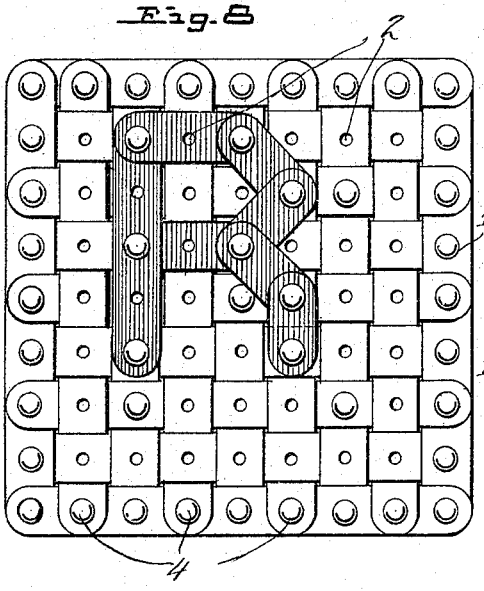
Fig. 8 is a view similar to Fig. 1 but with a letter affixed or superposed thereon.

In detail:

The device comprises the strips 1, which may be formed of any flexible material such as felt or the like and, if desired, may be of different colors; that is to say, sets of different colored strips may be provided.

The strips 1 have spaced therealong at suitable intervals, the holes or apertures 2 which are adapted to receive such a fastening member as is shown in Fig. 14.

These fastening members simulate collar buttons and are provided with a base 3 and head 4 connected by shank 5.

Figure 9:
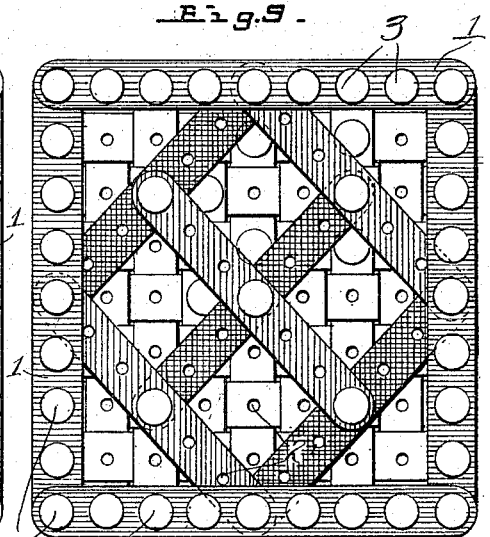
Fig. 9 is a view similar to Fig. 1 but with a pattern superposed or woven thereinto.
Figure 10:
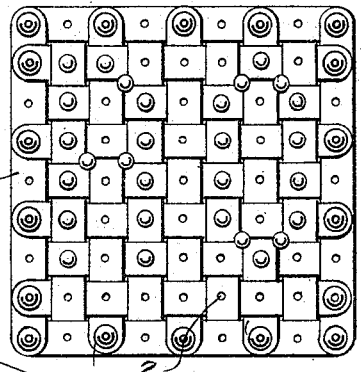
Fig. 10 is a view similar to Fig. 1 but with letters incorporated by means of the fastening members.
Figure 11:
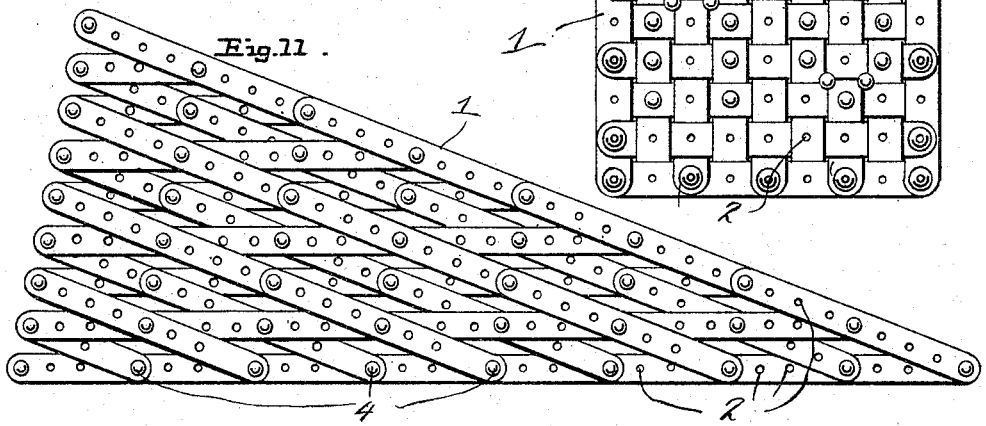
Fig. 11 is a view of the device modeled in a pennant form with lazy-tongs effect.

The strips 1 may be of different lengths and may be assembled in any form which may suit the fancy of the user of the device. The flexible nature of the device is evidenced by the number of figures illustrated in the drawings which are only a few of those which may be constructed in a similar manner. Considering Figs. 1 to 7; these devices or configurations are formed by weaving. In Fig. 1, the strips 1 are cross woven in close relation. The strips selected for this purpose are all of the same length and have equally spaced apertures therealong. In weaving up this form, the marginal members are selected and connected by means of the fastening members into rectangular form which results in leaving a plurality of apertures along each margin of the rectangle. The body of the figure is then woven by weaving the plurality of the strips in and out as shown in the usual form and connecting the other ends of the aperture left at the edges. If desired, apertures may be skipped along the edges and a fewer number of strips employed to form a body as shown in Figs. 2 to 7, inclusive, or the configuration may be in the form of a parallelogram, diamond, or the like. Considering Figs. 8 to 10, inclusive, and more particularly Fig. 8, after such a back ground as that shown in Fig. 1 is woven, a letter may be superposed thereon by taking a plurality of proper length strips and forming the letter as shown in Fig. 8. It will be found upon those overlying the letter that the apertures and the strips thereof, which are equally spaced with respect to the apertures of the strips 1, will register with the apertures of the strips forming the back ground and in this way fastening members may be inserted through the strips where they overlap and will secure the figure, letter or the like to the face of the back ground. In a similar way, patterns such as shown in Fig. 9 may be formed or woven into the surface of the back ground. Likewise, as shown in Fig. 10, the fastening members thus may be utilized to form letters, patterns, figures or the like, in which case, when the back ground such as shown in Fig. 1 is used, the fastening members may be inserted through the apertures of the strips or in the interstices of the strips thus forming any desired letter according to the manner in which the fastening members are disposed. In Fig. 11 the strips have been woven into a pennant configuration by disposing the said strips in lazy-tongs relation, each fastening member forming a joint of the tongs.

The manner of forming words and the like is shown clearly in Figs. 12 and 13 in which case the back ground is made up similar to that shown in Fig. 1 and the letters disposed thereon are made of shorter strips and are placed in their proper order and secured by the fastenings.

From the foregoing, it will be evident that a number of figures or configurations, or combination of strips may be formed in the manner indicated and thus the flexibility of the device is only limited by the mind and conceptions of the operator. In this way the device presents a novel problem which may be varied in difficulty to suit.

While, in the foregoing, I have described specific embodiments of the invention, it is nevertheless to be understood that, in practice, I may resort to such practical modifications as fall within the scope of the invention as defined in the appended claims.

I claim:—

1. An educational modeling device comprehending a series of strips apertured at intervals and interwoven to form concrete figures, and members extending through the registering apertures of the various strips to form a fastening means therefor.

2. An educational modeling device comprehending a series of flexible strips interwoven to form a pattern, said strips having apertures spaced therealong, and fastening means inserted through such registering apertures of the overlapping strips.

3. An educational modeling device comprehending a series of strips woven together, said strips being provided with apertures registering when woven, fastening means disposed in such apertures, and a figure formed on said woven strips by similar strips and held in place by the same fastening means.

4. An educational modeling device comprehending a series of strips woven together, said strips being provided with apertures registering when woven, fastening means disposed in such apertures, a figure formed on said woven strips by similar strips, and separate fastening means from the first mentioned means for holding the said figure in place relative to the woven strips.

5. An educational device consisting of a plurality of strips, means interconnecting said strips in woven relation, fastening means disposed in the interstices of said strips, and a figure superposed on said woven strips and held in place by said last mentioned fastening means.

In testimony whereof I affix my signature in presence of two witnesses.

ALWIN B. BACHMANN.

Witnesses:
IRENE WERTH BACHMANN,
BESSIE L. BURKHART.

Copies of this patent may be obtained for five cents each, by addressing the "Commissioner of Patents, Washington, D. C."